United States Patent
Rhoden et al.

(10) Patent No.: US 11,236,957 B2
(45) Date of Patent: Feb. 1, 2022

(54) METHOD OF ADDITIVELY MANUFACTURING A HEAT EXCHANGER COMPONENT WITH EMBEDDED SENSOR

(71) Applicant: Hamilton Sundstrand Corporation, Charlotte, NC (US)

(72) Inventors: William E. Rhoden, Glastonbury, CT (US); John W. Kowalski, Hadley, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 284 days.

(21) Appl. No.: 16/449,575

(22) Filed: Jun. 24, 2019

(65) Prior Publication Data

US 2019/0331441 A1 Oct. 31, 2019

Related U.S. Application Data

(62) Division of application No. 15/381,809, filed on Dec. 16, 2016, now Pat. No. 10,330,404.

(51) Int. Cl.
*B33Y 10/00* (2015.01)
*F28F 27/00* (2006.01)
(Continued)

(52) U.S. Cl.
CPC ............ *F28F 27/00* (2013.01); *B22F 3/1017* (2013.01); *B22F 7/06* (2013.01); *B22F 10/20* (2021.01);
(Continued)

(58) Field of Classification Search
CPC .......................... B33Y 10/00; Y10T 29/49982
See application file for complete search history.

(56) References Cited

U.S. PATENT DOCUMENTS 4,777,475 A 10/1988 Mita et al.
4,904,080 A 2/1990 Afromowitz
(Continued)

FOREIGN PATENT DOCUMENTS

EP 3068994 A1 9/2016
GB 2452026 A 2/2009
WO 2015112858 A1 7/2015

OTHER PUBLICATIONS

H. Tsai et al., "Additive Manufacturing of Smart Parts with Embedded Sensors for In-Situ Monitoring in Advanced Energy Systems", University of Cincinnati, 2015, 41 pages.
(Continued)

*Primary Examiner* — Sarang Afzali
(74) *Attorney, Agent, or Firm* — Cantor Colburn LLP

(57) ABSTRACT

An additively manufactured component is provided. The additively manufactured component includes an additively manufactured first part defining a first trench, an additively manufactured second part defining a second trench and a fiber optic sensor. The additively manufactured first and second parts are additively manufactured together with the first and second trenches corresponding in position such that the additively manufactured first and second parts form an assembled part with a fiber channel cooperatively defined by the first and second trenches. The fiber optic sensor includes a first sensor part embedded in the fiber channel and a second sensor part operably coupled to the first sensor part and extendible at an exterior of the assembled part.

9 Claims, 4 Drawing Sheets

(51) Int. Cl.

| | |
|---|---|
| *B33Y 80/00* | (2015.01) |
| *B33Y 70/00* | (2020.01) |
| *B22F 7/06* | (2006.01) |
| *B22F 3/10* | (2006.01) |
| *B23K 15/00* | (2006.01) |
| *B23K 26/342* | (2014.01) |
| *G01B 11/16* | (2006.01) |
| *G01K 11/32* | (2021.01) |
| *F28F 3/12* | (2006.01) |
| *G01K 1/14* | (2021.01) |
| *B29C 64/112* | (2017.01) |
| *B29C 64/129* | (2017.01) |
| *B29C 64/153* | (2017.01) |
| *B22F 10/20* | (2021.01) |
| *B29L 31/18* | (2006.01) |
| *B23K 101/36* | (2006.01) |

(52) U.S. Cl.
CPC ........ *B23K 15/0086* (2013.01); *B23K 26/342* (2015.10); *B29C 64/112* (2017.08); *B29C 64/129* (2017.08); *B29C 64/153* (2017.08); *B33Y 10/00* (2014.12); *B33Y 70/00* (2014.12); *B33Y 80/00* (2014.12); *F28F 3/12* (2013.01); *G01B 11/16* (2013.01); *G01K 1/14* (2013.01); *G01K 11/32* (2013.01); *B22F 2998/10* (2013.01); *B23K 2101/36* (2018.08); *B29L 2031/18* (2013.01); *F28F 2255/18* (2013.01); *Y02P 10/25* (2015.11); *Y10T 29/49982* (2015.01)

(56) References Cited

U.S. PATENT DOCUMENTS

| | | | |
|---|---|---|---|
| 5,170,459 A | | 12/1992 | Norton et al. |
| 5,390,273 A | | 2/1995 | Rahman et al. |
| 6,420,696 B1 | | 7/2002 | Bennett |
| 6,493,072 B1 | | 12/2002 | Medberry et al. |
| 6,568,846 B1 | | 5/2003 | Cote et al. |
| 8,004,423 B2 | | 8/2011 | Mitchell et al. |
| 9,194,991 B2 | | 11/2015 | Chiang et al. |
| 9,414,501 B2 | | 8/2016 | Wicker et al. |
| 10,633,758 B2 * | | 4/2020 | Kotler .................. B22F 3/1103 |
| 2004/0076393 A1 | | 5/2004 | Singh et al. |
| 2004/0184700 A1 | | 9/2004 | Li et al. |
| 2005/0050962 A1 | | 3/2005 | Zerwekh et al. |
| 2006/0056960 A1 | | 3/2006 | Sabol et al. |
| 2007/0196059 A1 | | 8/2007 | Kojima |
| 2009/0129721 A1 | | 5/2009 | Chen et al. |
| 2014/0153087 A1* | | 6/2014 | Hutchings ................. G01J 3/44 |
| | | | 359/368 |
| 2015/0098161 A1* | | 4/2015 | Horowy ................... H02H 9/02 |
| | | | 361/87 |
| 2016/0091388 A1 | | 3/2016 | Baere |
| 2016/0305271 A1* | | 10/2016 | Schmidt ................. B64D 45/00 |
| 2017/0182712 A1 | | 6/2017 | Scribner et al. |
| 2017/0282452 A1 | | 10/2017 | Ravich et al. |

OTHER PUBLICATIONS

Havermann et al., "Temperature and Strain Measurements With Fiber Bragg Gratings Embedded in Stainless Steel 316", Journal of Lightwave Technology, 2015, 13 pages.

Kong et al, "Fabrication of Metal-Matrix Composites and Adaptive Composites Using Ultrasonic Consolidation Process", Material Science and Engineering, 2005, 19 pages.

Li et al., "Shape Deposition Manufacturing of Smart Metallic Structures with Embedded Sensors", Proceedings of SPIE, 2000, 51 pages.

R. Maier et al, "Embedded Fiber Optic Sensors Within Additive Layer Manufactured Components", IEEE Sensors Journal, vol. 13, No. 3, 2013, pp. 969-978.

Saheb et al., "Fiber-Embedded Metallic Materials: From Sensing towards Nervous Behavior", MDPI, 2015, 26 pages.

Search Report dated May 30, 2018 in U380828EP, EP Patent Application No. EP17207805, 11 pages.

* cited by examiner

METHOD OF ADDITIVELY MANUFACTURING A HEAT EXCHANGER COMPONENT WITH EMBEDDED SENSOR

CROSS-REFERENCE TO RELATED APPLICATIONS

This application is a divisional of U.S. application Ser. No. 15/381,809, filed Dec. 16, 2016. The entire contents of U.S. application Ser. No. 15/381,809 are incorporated herein by reference.

BACKGROUND

The following description relates to heat exchangers and, more particularly, to heat exchanger components with embedded sensors that are assembled by way of additive manufacturing such as direct metal laser sintering (DMLS) or other three-dimensional (3D) printing methods.

Monitoring performance or conditions inside certain devices can be challenging. For example, determining temperatures inside gas turbine engines often require that special temperature sensors, which can survive in very high temperature and high pressure environments be used but those types of features can be expensive and often require that additional structural supports be built inside the devices. Moreover, the specialized sensors and their associated structures can have poor reliability characteristics.

BRIEF DESCRIPTION

According to one aspect of the disclosure, an additively manufactured component is provided. The additively manufactured component includes an additively manufactured first part defining a first trench, an additively manufactured second part defining a second trench and a fiber optic sensor. The additively manufactured first and second parts are additively manufactured together with the first and second trenches corresponding in position such that the additively manufactured first and second parts form an assembled part with a fiber channel cooperatively defined by the first and second trenches. The fiber optic sensor includes a first sensor part embedded in the fiber channel and a second sensor part operably coupled to the first sensor part and extendible at an exterior of the assembled part.

In accordance with additional or alternative embodiments, the additively manufactured first and second parts are formed from at least one of fused deposition modeling (FDM), fused filament fabrication (FFF), direct ink writing (DIW), stereo-lithography (SLA), digital light processing (DLP), powder bed and inkjet 3D printing (3DP), powder bed fusion (PBF), electron beam melting (EBM), selective laser melting (SLM), selective heat sintering (SHS), selective laser sintering (SLS), direct metal laser sintering (DMLS), laminated object manufacturing (LOM), directed energy deposition and electron beam freeform fabrication (EBF$^3$).

In accordance with additional or alternative embodiments, at least one of the additively manufactured first and second parts includes at least one of aluminum (Al), nickel (Ni), titanium (Ti), cobalt-based alloys, steels, ceramics, cermets, photopolymers and thermoplastics.

In accordance with additional or alternative embodiments, a central axis of the fiber channel is offset from respective planes of outermost layers of the additively manufactured first and second parts.

In accordance with additional or alternative embodiments, the fiber optic sensor is at least one of a strain sensor and a temperature sensor and further includes a processing unit to process sensor readings obtained by the first part.

In accordance with additional or alternative embodiments, each of the additively manufactured first and second parts defines multiple first and second trenches, respectively, such that the assembled part has multiple fiber channels and the fiber optic sensor includes multiple first sensor parts respectively embedded in a corresponding one of the multiple fiber channels.

In accordance with additional or alternative embodiments, the first sensor part includes a thermal barrier coating (TBC).

In accordance with additional or alternative embodiments, the first sensor part and the TBC tightly fit in the fiber channel.

In accordance with additional or alternative embodiments, the first sensor part and the TBC are embedded with preloading in the fiber channel.

In accordance with additional or alternative embodiments, the TBC includes a protruding surface feature and the fiber channel is defined by a corresponding one of the first and second trenches to include a recessed surface feature corresponding in position to the protruding surface feature.

In accordance with additional or alternative embodiments, the fiber channel is defined by the first and second trenches to include first and second transverse channel components in which corresponding sections of the first sensor part and the TBC are respectively embedded.

In accordance with another aspect of the disclosure, a fiber optic sensor is provided for operable disposition in a fiber channel of an additively manufactured component. The fiber optic sensor includes a first sensor part embedded in the fiber channel and comprising an exterior surface and a thermal barrier coating (TBC) disposed thereon to protect the exterior surface during additive manufacturing processes, a second sensor part operably coupled at a first end thereof to the first sensor part and extendible at an exterior of the assembled part and a processing unit operably coupled to a second end of the second sensor part to process sensor readings obtained by the first part.

In accordance with additional or alternative embodiments, the first sensor part is configured for at least one of strain and temperature sensing.

In accordance with additional or alternative embodiments, the TBC includes a protruding surface feature that corresponds with a recessed surface feature of the fiber channel.

In accordance with additional or alternative embodiments, the first sensor part and the TBC each have corresponding sections that are respectively embedded in first and second transverse components of the fiber channel.

According to yet another aspect of the disclosure, a method of additively manufacturing a component is provided. The method includes additively manufacturing a first part to define a trench, laying down an optical fiber in the trench and additively manufacturing a second part onto the first surface and around the optical fiber to extend the trench into a fiber channel in which the optical fiber is embedded.

In accordance with additional or alternative embodiments, the additive manufacturing of the first and second parts includes at least one of fused deposition modeling (FDM), fused filament fabrication (FFF), direct ink writing (DIW), stereo-lithography (SLA), digital light processing (DLP), powder bed and inkjet 3D printing (3DP), powder bed fusion (PBF), electron beam melting (EBM), selective laser melting (SLM), selective heat sintering (SHS), selective laser sintering (SLS), direct metal laser sintering (DMLS), laminated object manufacturing (LOM), directed energy deposition and electron beam freeform fabrication (EBF³).

In accordance with additional or alternative embodiments, the method further includes pre-loading optical fiber and the TBC in the fiber channel.

In accordance with additional or alternative embodiments, the applying of the TBC includes forming a protruding surface feature and the additive manufacturing of the second part around the optical fiber includes forming a recessed surface feature corresponding in position to the protruding surface feature.

In accordance with additional or alternative embodiments, the additive manufacturing of the first part includes forming the trench to include first and second transverse components, the laying down of the optical fiber includes laying down sections of the optical fiber with the TBC applied thereto in the first and second transverse components and the additively manufacturing of the second part includes extending the first and second transverse components of the trench into first and second transverse components of the fiber channel.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
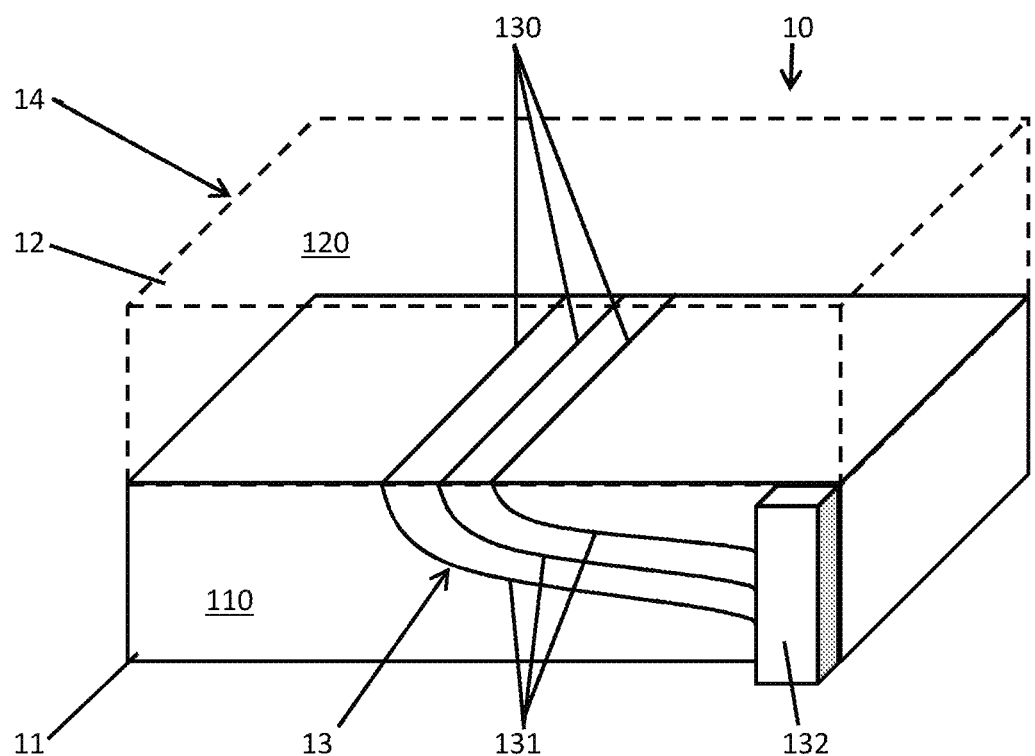
FIG. 1 is a perspective view of an assembled part with an embedded fiber optic sensor in accordance with embodiments.

As will be described below, additive manufacturing techniques are applied to allow for the integration of sensing elements into a structure or assembled part so that a self-aware component can be realized. Such components can monitor performance or conditions inside and outside of the self-aware component without the need to add on addition components that reduce reliability and increase cost. In an exemplary case, an additive build process is executed to provide a component with a shallow trench of about 75 microns in diameter in which an optical fiber can be placed. The additive build process proceeds and encases the optical fiber inside the resulting component. Optical leads are routed from the optical fiber to a transducer where sensor readings are converted to electrical signals as required for processing.

In some cases, a thin thermal coating can be provided on the optical fiber so that the optical fiber (melting point ~1700° C.) can withstand at least a few microseconds at a melt pool maximum temperature (~2900° C.) associated with certain additive manufacturing processes. Internal health monitoring can be performed to determine component temperatures or structural integrity issues for select locations with multiple leads/wires to thereby ensure robustness and to preclude reliability limitations.

With reference to FIGS. 1-4, an additively manufactured component 10 is provided. The additively manufactured component 10 includes an additively manufactured first part 11, an additively manufactured second part 12 and a fiber optic sensor 13. The additively manufactured first part 11 includes a body 110 that is formed of multiple layers 111 and the additively manufactured second part 12 includes a body 120 that is formed of multiple layers 121. For the non-limiting and exemplary embodiment in which the fiber optic sensor 13 is disposed between an upper surface 112 of the additively manufactured first part 11 and a lower surface 122 of the additively manufactured second part 12, the multiple layers 111 proximate to the upper surface 112 cooperatively define at least a segment of a first trench 113 with the uppermost one of the multiple layers 111 actually forming the upper surface 112 (see FIG. 3) and the multiple layers 121 proximate to the lower surface 122 cooperatively define at least a segment of a second trench 123 with the lowermost one of the multiple layers 121 actually forming the lower surface 122 (see FIG. 4).

The additively manufactured first and second parts 11 and 12 are additively manufactured together. That is, the lower surface 122 of the additively manufactured second part 12 is additively manufactured onto the upper surface 112 of the additively manufactured first part 11 in the non-limiting and exemplary embodiment provided above. The additively manufactured first and second parts 11 and 12 thus form an assembled part 14. Therefore, with the first and second trenches 113 and 123 corresponding with one another in terms of at least their respective positions, the first and second trenches 113 and 123 cooperatively define an optical fiber channel 15.

The fiber optic sensor 13 may be configured for sensing strain and/or temperature within the assembled part 14 and includes a first sensor part 130, a second sensor part 131 and a processing unit 132. The first sensor part 130 is embedded in the fiber channel 15. The second sensor part 131 is operably coupled at a first end thereof to the first sensor part 130 and is extendible at an exterior of the assembled part 14. The processing unit 132 is operably coupled to a second end of the second sensor part 131 and is configured to process and to analyze sensor readings obtained by the first sensor part 130. In doing so, the processing unit 132 may be configured to consider heat transfer capabilities of the materials of the assembled part 14. That is, if the assembled part 14 is disposed within a high temperature and high pressure fluid flow of, for example, a gas turbine engine, the interior of the assembled part 14 where the fiber optic sensor 13 is located will be heated at a different rate as compared to the peripheral portions that are closer to the actual fluid flow. In any case, the processing unit 132 can be used to determine both the temperature of the interior of the assembled part 14 and to calculate temperatures of the peripheral portions of the assembled part 14 from the interior temperature.

Figure 5:
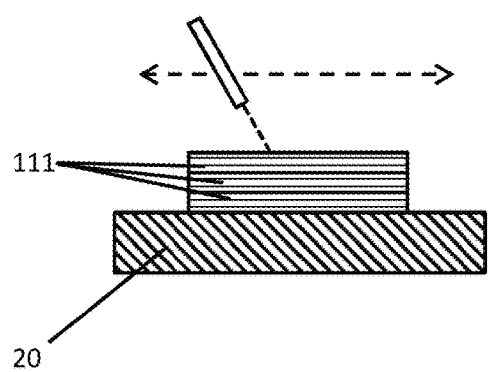
FIG. 5 is a diagram illustrating an additive manufacturing process for additively manufacturing a first part of the assembled part of FIG. 1.
Figure 6:
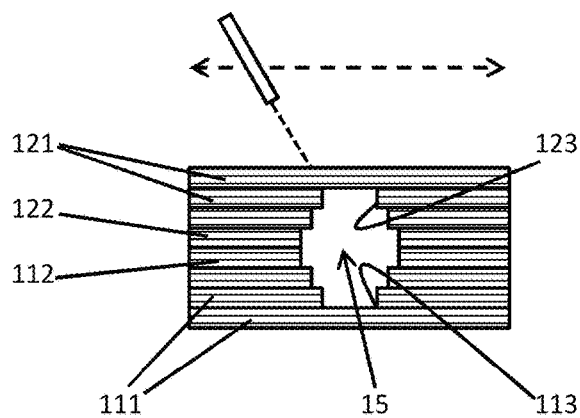
FIG. 6 is a diagram illustrating an additive manufacturing process for additively manufacturing a second part of the assembled part of FIG. 1.

With reference to FIGS. 5 and 6, the additively manufactured first and second parts 11 and 12 may be fabricated by at least one or more of fused deposition modeling (FDM), fused filament fabrication (FFF), direct ink writing (DIW), stereo-lithography (SLA), digital light processing (DLP), powder bed and inkjet 3D printing (3DP), powder bed fusion (PBF), electron beam melting (EBM), selective laser melting (SLM), selective heat sintering (SHS), selective laser sintering (SLS), direct metal laser sintering (DMLS), laminated object manufacturing (LOM), directed energy deposition and electron beam freeform fabrication (EBF$^3$). In accordance with embodiments, the additively manufactured first and second parts 11 and 12 may be formed of at least one or more of aluminum (Al), nickel (Ni), titanium (Ti), cob alt-based alloys or any other type of metallic alloys, stainless or non-stainless steels, ceramics, cermet, photopolymers, powdered polymers and thermoplastics.

In an exemplary case where the additively manufactured first and second parts 11 and 12 are formed from DMLS and are made of aluminum (Al), as shown in FIG. 5, the multiple layers 111 are laid down on a jig 20 in sequence with each of the multiple layers 111 being formed of metallic powder that is deposited and then melted and bonded to surrounding metallic materials by a laser that passes over the surface area of the deposited metallic powder. As the multiple layers 111 are built up on top of lower layers and reaches the height of the first trench 113, the laser avoids passing over the region where the first trench 113 is to be formed. This avoids the creation of metallic bonds and results in the definition of the segment of the first trench 113 once all of the multiple layers 111 are finally formed.

As shown in FIG. 6, the multiple layers 121 are similarly laid down on the upper surface 112 (instead of the jig 20). As such, each of the multiple layers 121 is formed of metallic powder that is deposited and then melted and bonded to surrounding metallic materials by the laser. As the multiple layers 121 are built up on top of lower layers at the height of the second trench 123, the laser avoids passing over the region where the second trench 123 is to be formed so as to avoid the creation of metallic bonds in this region with the result being the definition of at least the segment of the second trench 123 once the multiple layers 121 are finally formed.

Figure 7:
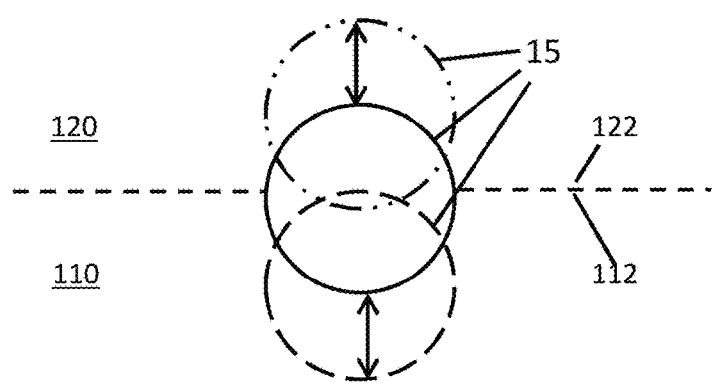
FIG. 7 is an enlarged schematic illustration of a fiber optic sensor positioned between additively manufactured first and second parts in accordance with embodiments.

With reference to FIG. 7, a central axis of the fiber channel 15 can be aligned with or offset from respective planes of outermost layers (i.e., the upper surface 112 and the lower surface 122) of the additively manufactured first and second parts 11 and 12. In the former case, where the fiber channel 15 has a circular cross-sectional shape, for example, the first trench 113 and the second trench 123 would each be formed to have semi-circular cross-sectional shapes of substantially similar size. In the latter case, where again the fiber channel 15 has the circular cross-sectional shape, the first trench 113 can be formed to have a segmented-circular shape that is larger or smaller than a semicircle and the second trench 123 can be formed to have a complementarily segmented-circular shape that is smaller or larger than the semi-circle.

With reference back to FIGS. 1 and 2, each of the additively manufactured first and second parts 11 and 12 can be formed to define multiple first and second trenches 113 and 123, respectively, such that the assembled part 14 has multiple fiber channels 15. Similarly, the fiber optic sensor 13 may include or be provided with multiple first sensor parts 130 that are each respectively embedded in a corresponding one of the multiple fiber channels 15.

Figure 2:
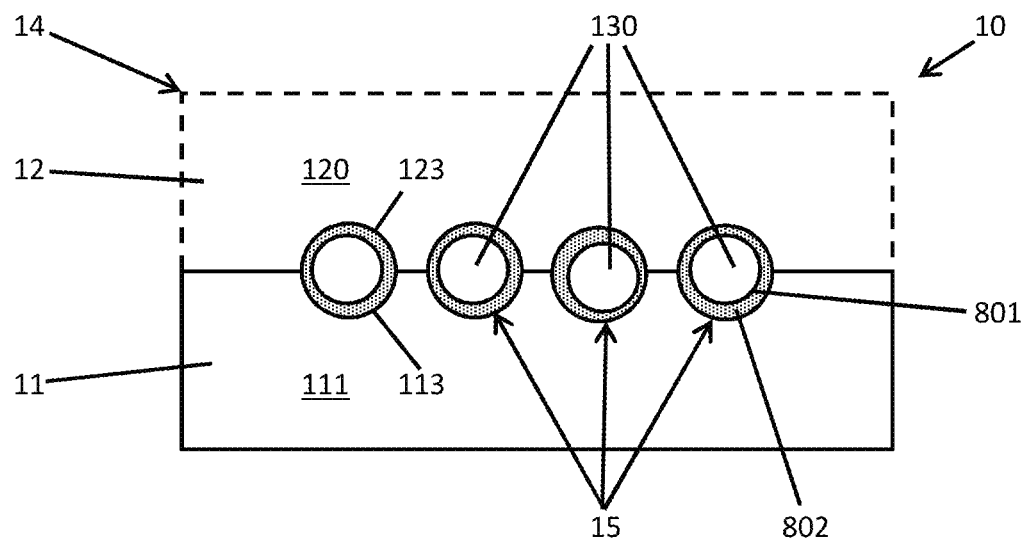
FIG. 2 is a side schematic view of the assembled part of FIG. 1.
Figure 3:
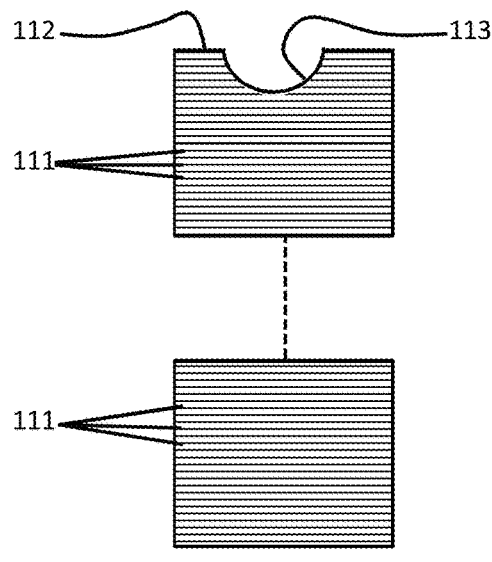
FIG. 3 is an enlarged schematic view of components of an additively manufactured first part of the assembled part of FIG. 1.
Figure 4:
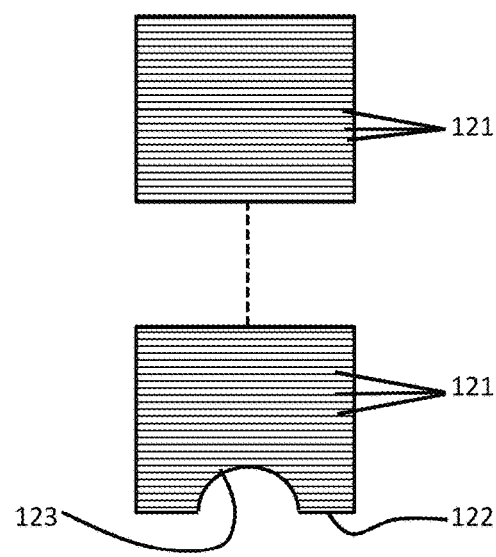
FIG. 4 is an enlarged schematic view of components of an additively manufactured second part of the assembled part of FIG. 1.

With continued reference back to FIG. 2, additive manufacturing processes can generate extremely high local temperatures at locations where the laser light is incident on the deposited metallic powder. Where the additive manufacturing processing include DMLS and the deposited metallic powder includes aluminum (which has a melting temperature of about 660° C. and a boiling temperature of about 2519° C.) or nickel (which has a melting temperature of about 1455° C. and a boiling temperature of about 2913° C.), for example, the local temperatures at which DMLS occurs can exceed the temperature range at which the fiber optic sensor 13 can be damaged. This is true even for high-purity, telecom-grade optical fibers whose melting point is around 1700° C. As such, as shown in FIG. 2, at least the first sensor part 130 of the optical fiber sensor 13 may include an exterior surface 801 and a thermal barrier coating (TBC) 802. The TBC 802 is applied to the exterior surface 801 and thus disposed to protect the exterior surface 801 and the first sensor part 130/optical fiber sensor 13 as a whole from thermal damage resulting from the DMLS processing.

With continued reference to FIG. 2 and, in accordance with embodiments, the first sensor part 130 and the TBC 802 (if applicable) are disposed to tightly fit in the fiber channel 15. That is, where an interior surface of the TBC 802 conforms to a contour of the exterior surface 801, an interior surface of the fiber channel 15 conforms to a contour of an exterior surface of the TBC 802. As such, the first sensor part 130 can be securely held by frictional contact between abutting surfaces in the fiber channel 15.

Figure 8:
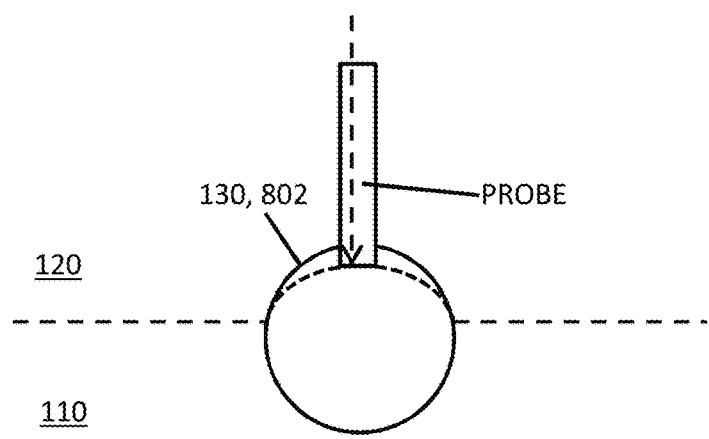
FIG. 8 is an enlarged schematic illustration of preloading of a fiber optic sensor in accordance with embodiments.

With reference to FIG. 8 and, in accordance with further embodiments, the first sensor part 130 and the TBC 802 (if applicable) are embedded with pre-loading in the fiber channel 15. This can be accomplished, for example, by laying down the first sensor part 130 and the TBC 802 in the first trench 112 and then applying localized pressure thereto (e.g., by pushing down on the TBC 802 with a probe) while the additively manufactured second part 12 is built up around them. Once the locally pressurized sections of the first sensor part 130 and the TBC 802 are surrounded by material of the additively manufactured second part 12, the application of the localized pressure is relieved (e.g., by removing the probe) and the additively manufactured second part 12 is completed. The resulting preloading can increase frictional contact between abutting surfaces in the fiber channel 15 and can be accounted for by the processing unit 132 in analyzing sensor readings.

Figure 9:
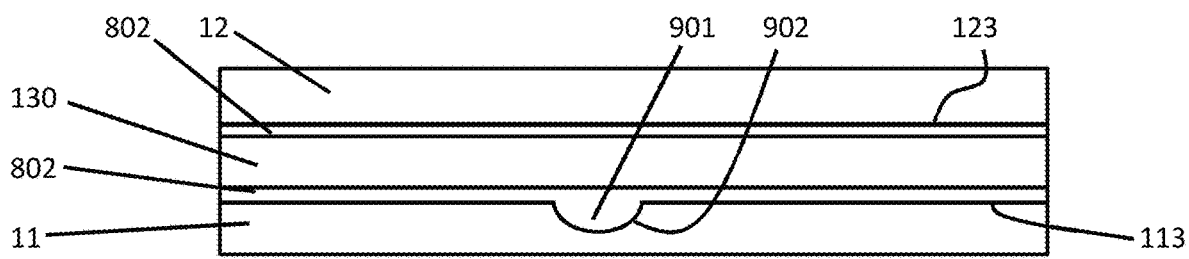
FIG. 9 is a top down view of protruding and recessed features to secure a fiber optic sensor within a fiber channel in accordance with embodiments.

With reference to FIG. 9 and, in accordance with further embodiments, at least the TBC 802 may include a protruding surface feature 901 and the fiber channel 15 may be defined by a corresponding one of the first and second trenches 113 and 123 to include a recessed surface feature 902 which corresponds in position to the protruding surface feature 901. The protruding surface feature 901 can be a bump or a hook shaped element and the recessed surface feature 902 can be a dimple that is receptive of the bump or a reversed hook that engages with the hook shaped element. In either case, the protruding surface feature 901 and the recessed surface feature 902 mechanically interact with one another to secure the first sensor part 130 in place within the fiber channel 15. The protruding surface feature 901 can be built up of the TBC 802 alone or may be formed as part of the first sensor part 130. In the latter case, the TBC 802 is simply built up around and over the formation of the first sensor part 130.

Figure 10:
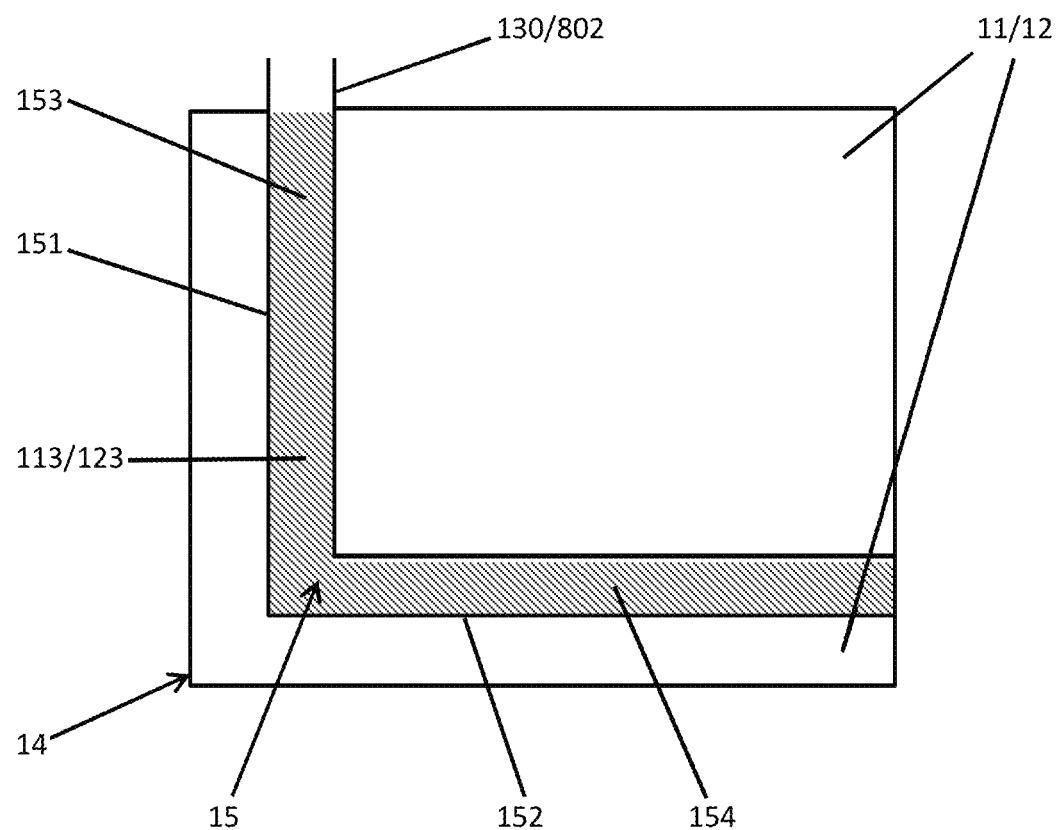
FIG. 10 is a top down view of a complex pathway of a fiber optic sensor within an assembled part in accordance with embodiments.

With reference to FIG. 10, the fiber channel 15 may be defined by the first and second trenches 113 and 123 (see FIG. 2) to include first and second transverse channel components 151 and 152. Within such first and second transverse channel components 151 and 152, corresponding sections 153 and 154 of the first sensor part 130 and the TBC 802 (if applicable) may be respectively embedded. With this configuration, multiple regions of the assembled part 14 can be accessible to the first sensor part 130 and the torturous path followed by the first sensor part 130 serves to secure the first sensor part 130 within the fiber channel 15.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of additively manufacturing a component, the method comprising:
   additively manufacturing a first part such that a first surface thereof defines a trench;
   laying down an optical fiber in the trench;
   additively manufacturing a second part onto the first surface and around the optical fiber such that the first part and the second part redefine the trench as a fiber channel in which the optical fiber is embedded; and
   applying a thermal barrier coating (TBC) to the optical fiber prior to the additive manufacturing of the second part, wherein:
   the applying of the TBC comprises forming a protruding surface feature which protrudes away from the optical fiber, and
   the additive manufacturing of the second part around the optical fiber comprises forming a recessed surface feature, which corresponds in position to the protruding surface feature and which extends into the second part to accommodate the protruding surface feature.

2. The method according to claim 1, wherein the additive manufacturing of the first and second parts comprises at least one of fused deposition modeling (FDM), fused filament fabrication (FFF), direct ink writing (DIW), stereolithography (SLA), digital light processing (DLP), powder bed and inkjet 3D printing (3DP), powder bed fusion (PBF), electron beam melting (EBM), selective laser melting (SLM), selective heat sintering (SHS), selective laser sintering (SLS), direct metal laser sintering (DMLS), laminated object manufacturing (LOM), directed energy deposition and electron beam freeform fabrication (EBF$^3$).

3. The method according to claim 1, further comprising pre-loading the optical fiber coating with the TBC in the fiber channel.

4. The method according to claim 1, wherein:
   the protruding surface feature comprises a bump and the recessed surface feature comprises a dimple that is receptive of the bump or the protruding surface feature comprises a hook shaped element and the recessed surface feature comprises a reverse hook shaped element that mechanically interacts with the hook shaped element.

5. The method according to claim 1, wherein:
   the additive manufacturing of the first part comprises forming the trench to include first and second transverse components;
   the laying down of the optical fiber comprises laying down sections of the optical fiber with the TBC applied thereto in the first and second transverse components; and
   the additively manufacturing of the second part comprises extending the first and second transverse components of the trench into first and second transverse components of the fiber channel.

6. A method of additively manufacturing a component, the method comprising:
   additively manufacturing a first part such that a first surface of the first part is formed to define a trench;
   laying down an optical fiber in the trench; and
   additively manufacturing a second part onto the first surface and around the optical fiber such that the first part and the second part redefine the trench as a fiber channel in which the optical fiber is embedded,
   wherein the method further comprises applying a coating to the optical fiber and forming a protruding feature, which protrudes away from the optical fiber, and the additive manufacturing of the second part around the optical fiber comprises forming a recessed feature, which corresponds in position to the protruding feature and which extends into the second part to accommodate the protruding feature.

7. The method according to claim 6, wherein the additive manufacturing of the first and second parts comprises at least one of fused deposition modeling (FDM), fused filament fabrication (FFF), direct ink writing (DIW), stereolithography (SLA), digital light processing (DLP), powder bed and inkjet 3D printing (3DP), powder bed fusion (PBF), electron beam melting (EBM), selective laser melting (SLM), selective heat sintering (SHS), selective laser sintering (SLS), direct metal laser sintering (DMLS), laminated object manufacturing (LOM), directed energy deposition and electron beam freeform fabrication (EBF$^3$).

8. The method according to claim 6, further comprising pre-loading optical fiber and the coating in the fiber channel.

9. The method according to claim 6, wherein:
   the additive manufacturing of the first part comprises forming the trench to include first and second transverse components; and
   the laying down of the optical fiber comprises laying down sections of the optical fiber with the coating applied thereto in the first and second transverse components.

* * * * *